Patented June 19, 1923.

1,459,347

UNITED STATES PATENT OFFICE.

EMIL STARKENSTEIN, OF PRAGUE, CZECHOSLOVAKIA.

PHARMACEUTICAL PRODUCT.

No Drawing. Application filed January 22, 1921. Serial No. 439,250.

*To all whom it may concern:*

Be it known that I, EMIL STARKENSTEIN, citizen of Czechoslovakia, residing at Prague, Czechoslovakia, have invented a new and useful Improvement in Pharmaceutical Products, of which the following is a specification.

The invention relates to the manufacture of a new pharmaceutical product, being a compound of diethylbarbituric acid and 4-dimethylamino-1-phenyl-2, 3-dimethyl-5-pyrazolon. The new product has a yellow colour, melts nearly completely at about from 95 to 97 centigrade and is soluble in water especially when heated, and in alcohol, ether and acetone. According to analysis it corresponds to the formula: $C_{34}H_{46}O_5N_8$. This product has strong analgetic properties, while the hypnotic effect is not enforced. Therefore it is, for instance, especially appropriate as a therapeutic agent against headache, tabic dolors etc., the usual dose being about 7½ grains (½ gramme).

The new compound is produced by melting together diethylbarbituric acid and 4-dimethylamino-1-phenyl-2, 3-dimethyl-5-pyrazolon, approximately in the proportion of one molecule of the former and two molecules of the latter. For instance, I proceed as follows:

462 parts by weight of 4-dimethylamino-1-phenyl-2, 3-dimethyl-5-pyrazolon are melted together with 184 parts by weight of diethylbarbituric acid, preferably at a temperature not exceeding about 110° centigrade. The resulting clear melt of yellow colour is after solidifying treated with water and purified in usual manner. The product possesses the properties above cited.

I claim as my invention:

1. The reaction product of the combination of diethylbarbituric acid and 4-dimethylamino-1-phenyl-2, 3-dimethyl-5-pyrazolon.

2. A compound consisting of diethylbarbituric acid and 4-dimethylamino-1-phenyl-2, 3-dimethyl-5-pyrazolon melted together in approximately the proportions of one molecule of the former and two molecules of the latter, the compound having a yellow color, being soluble in water, alcohol and ether, having strong analgetic properties and melting almost completely at about from 95° to 97° centigrade.

3. The process which consists in melting together approximately one molecule of diethylbarbituric acid and two molecules of 4-dimethylamino-1-phenyl-2, 3-dimethyl-5-pyrazolon.

4. The process which consists in melting together diethylbarbituric acid and 4-dimethylamino-1-phenyl-2, 3-dimethyl-5-pyrazolon at a temperature not exceeding about 110° centigrade.

5. The process which consists in melting together approximately one molecule of diethylbarbituric acid and two molecules of 4-dimethylamino-1-phenyl-2, 3-dimethyl-5-pyrazolon at a temperature not exceeding about 110° centigrade.

In testimony whereof I have hereunto set my signature in the presence of two subscribing witnesses.

PROF. DR. EMIL STARKENSTEIN.

Witnesses:
WILHELM WIESHOWSKI,
EMIL STRAUSKY.